Aug. 28, 1956

W. W. PAGET 2,760,392

TONGING MECHANISM FOR OIL WELL DRILL PIPE

Filed May 11, 1954

Inventor:
Wm. W. Paget.
by Charles F. Osgood,
Attorney.

Aug. 28, 1956 W. W. PAGET 2,760,392
TONGING MECHANISM FOR OIL WELL DRILL PIPE
Filed May 11, 1954 7 Sheets-Sheet 2
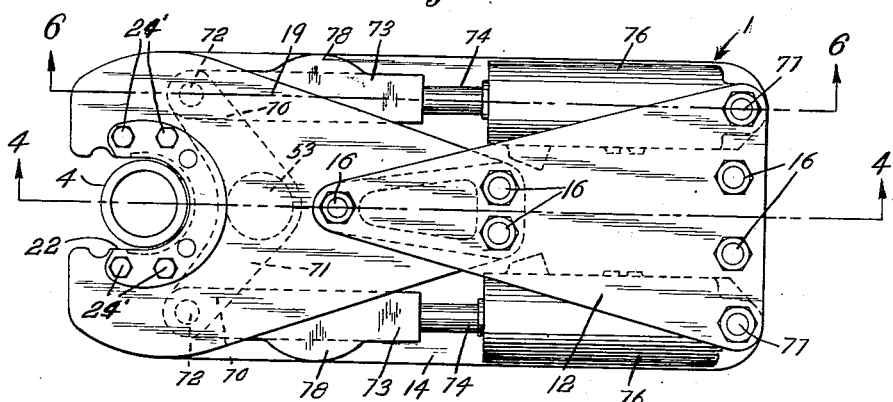
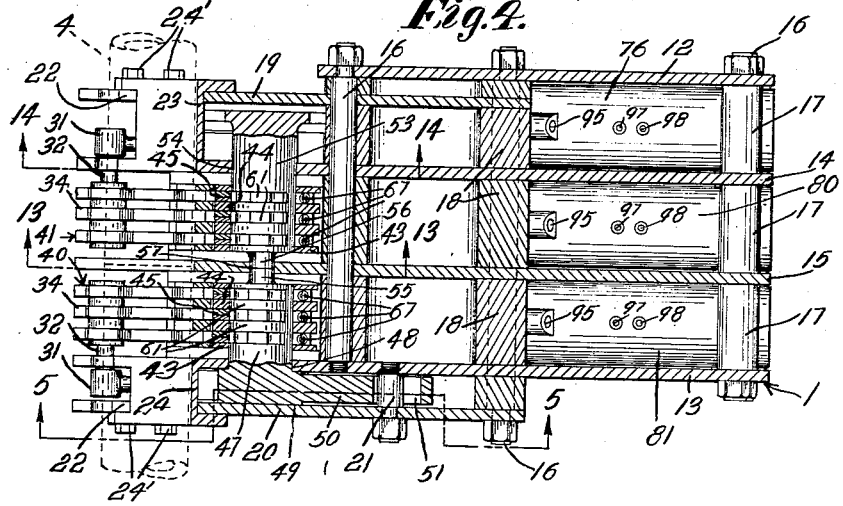
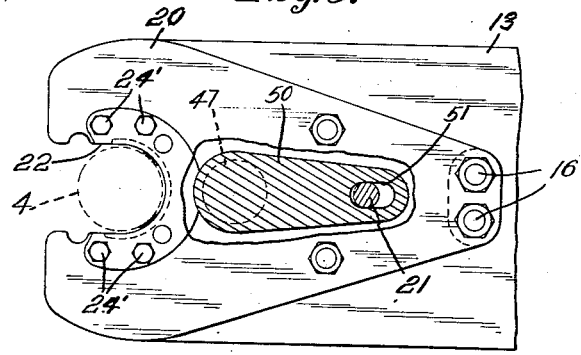
Inventor:
Win W. Paget.
By Charles F. Osgood,
Attorney.

Aug. 28, 1956 W. W. PAGET 2,760,392
TONGING MECHANISM FOR OIL WELL DRILL PIPE
Filed May 11, 1954 7 Sheets-Sheet 3

Inventor:
Wm. W. Paget.
by Charles F. Osgood,
Attorney.

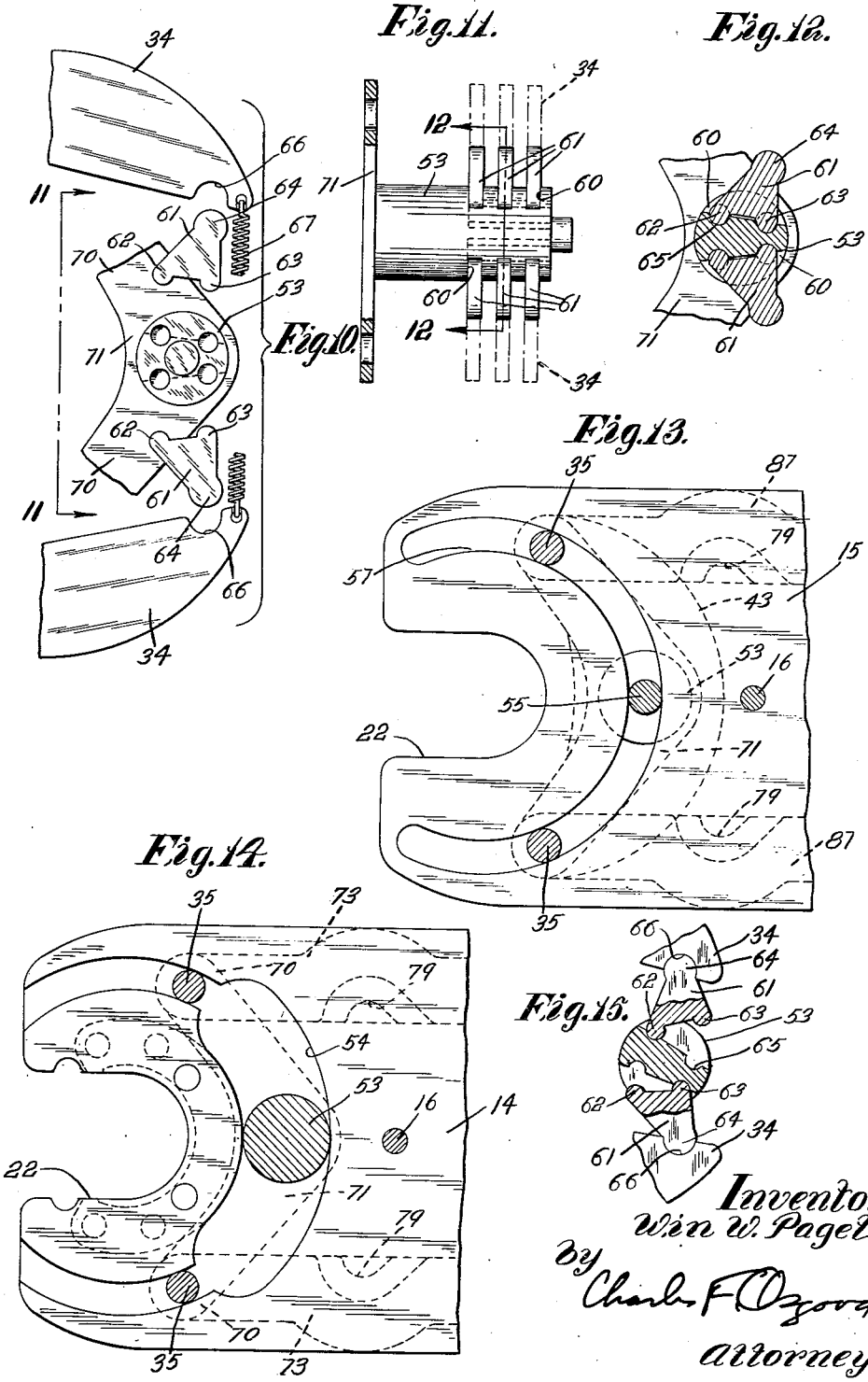

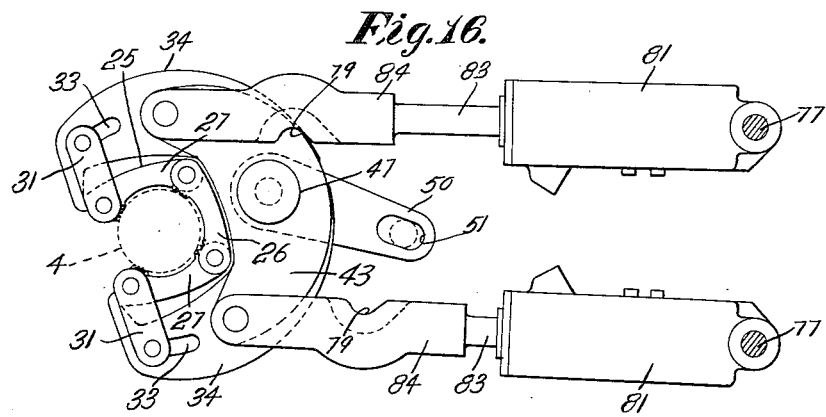
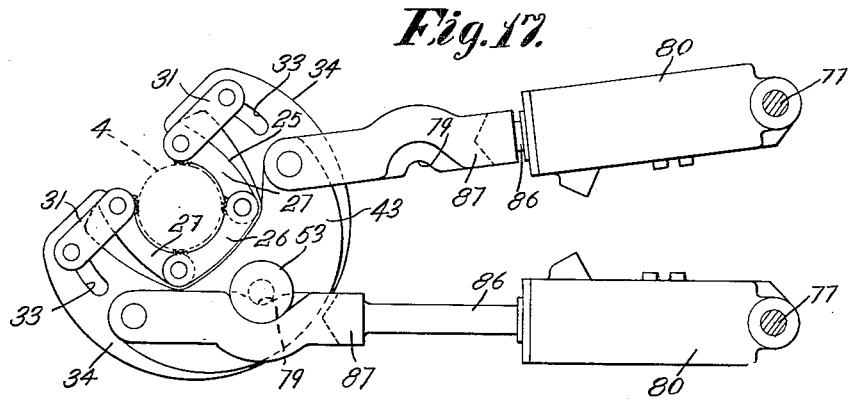
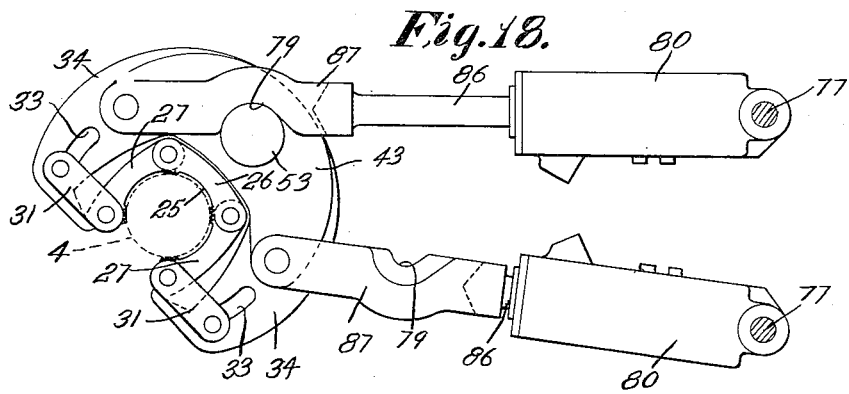

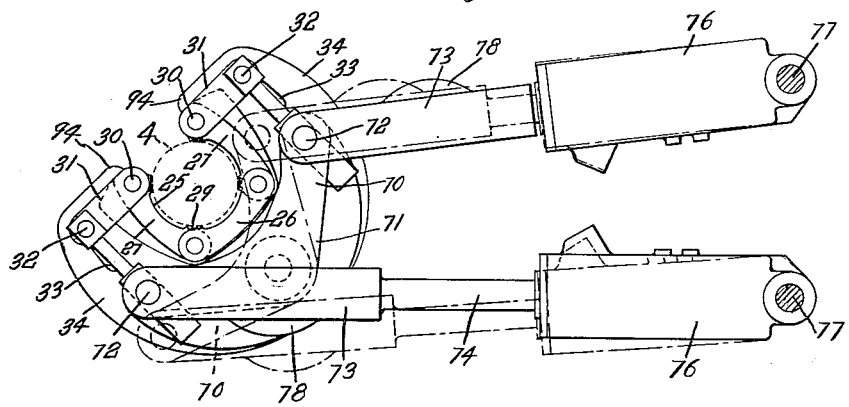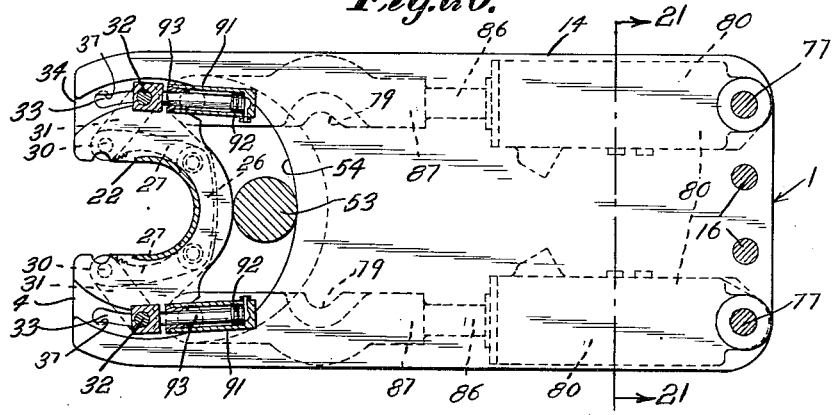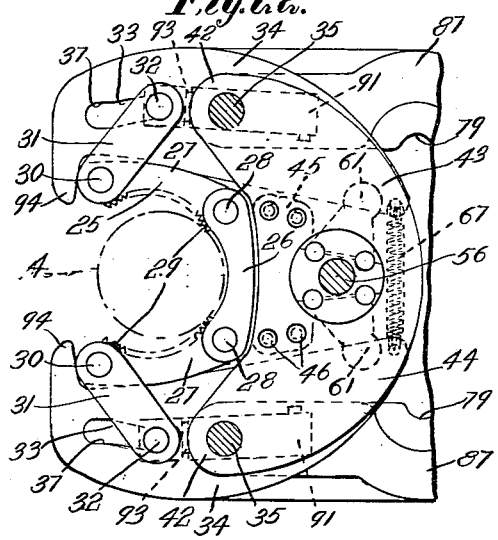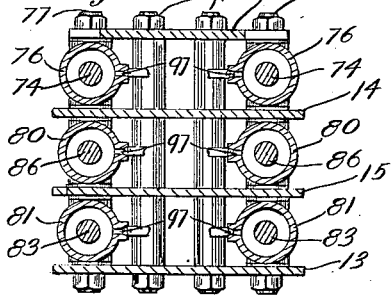

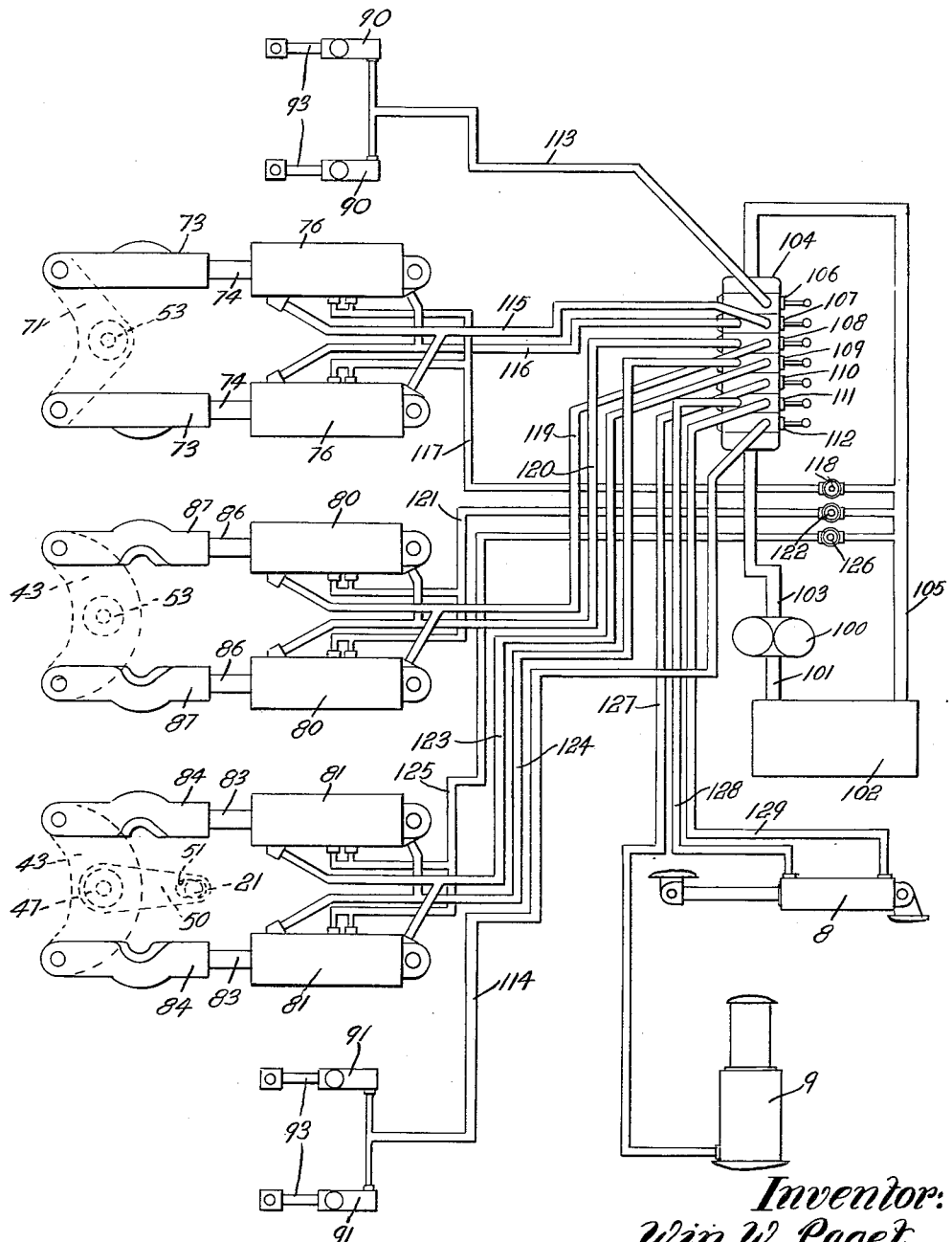

United States Patent Office 2,760,392
Patented Aug. 28, 1956

2,760,392
TONGING MECHANISM FOR OIL WELL DRILL PIPE

Win W. Paget, Mountain Brook, Ala., assignor to Joy Manufacturing Company, Pittsburgh, Pa., a corporation of Pennsylvania Application May 11, 1954, Serial No. 428,979

35 Claims. (Cl. 81—53)

This invention relates to tonging mechanism and more particularly to a tonging mechanism for making and breaking the tool joints of the drill pipe of an oil well drilling apparatus.

In an oil well drilling apparatus, a rotary mechanism usually drives a drill pipe which carries the drill bit and, as the hole deepens, drill pipe sections must be added and during pulling of the pipe line from the hole, pipe sections must be removed, and these operations of adding and removing drill pipe sections are laborious and time-consuming. During the making and breaking operations the pipe line is usually held against rotation by a holding or hold-back tong which grips the pipe section below the joint and the upper pipe section is gripped and rotated by the operating or make and break tong, either to loosen or tighten the tool joint, and the tongs are usually made reversible simply by rolling the tongs over to enable gripping of the drill pipe sections in the opposite direction. Various known forms of devices have been provided for effecting these make and break operations, and the present invention contemplates improvements over such known devices in that the tool joints may be made and broken in an improved and more effective manner.

An object of the present invention is to provide an improved tonging mechanism. Another object is to provide an improved reversible tonging mechanism which may be readily reversed while rolling over of the tongs is avoided. Yet another object is to provide an improved tonging mechanism embodying a holding tong and a make and break tong and having improved tong operating means whereby the elements of the tool joint may be effectively gripped and relatively rotated. A further object is to provide an improved tonging mechanism of the fluid operated type and embodying a novel arrangement of fluid operated cylinders for actuating the pipe gripping jaws. A still further object is to provide an improved tonging mechanism having improved and more effective pipe gripping means and embodying reversing means whereby the drill pipe may be gripped in either direction without the need for rolling the tongs over. Still another object is to provide an improved gripping jaw structure for a tonging mechanism whereby a powerful gripping force may be applied to the drill pipe. A still further object is to provide an improved tonging unit which embodies both the holding tong and the make and break tong in a single frame structure. These and other objects and advantages of the invention will, however, hereinafter more fully appear.

In the accompanying drawings there is shown for purposes of illustration one form which the invention may assume in practice.

In these drawings:

Fig. 3 is an enlarged top plan view of the tonging mechanism per se, shown in operative relation to a drill pipe.

Fig. 4 is a central longitudinal vertical section taken on line 4—4 of Fig. 3.

Fig. 5 is a fragmentary horizontal section taken on line 5—5 of Fig. 4, looking toward the bottom of the tonging mechanism.

Fig. 10 is a fragmentary plan view of elements of the jaw actuating means, with parts shown in separated relation to facilitate illustration.

Fig. 11 is a vertical sectional view taken on line 11—11 of Fig. 10.

Fig. 12 is a detail horizontal section taken on line 12—12 of Fig. 11.

Figs. 13 and 14 are fragmentary horizontal sections taken respectively, on lines 13—13 and 14—14 of Fig. 4.

Fig. 15 is a sectional view similar to Fig. 12, showing the cam shaft turned to effect gripping of the jaws.

Figs. 16, 17, 18 and 19 are somewhat diagrammatic plan views of the tonging mechanism, showing parts in different operating positions.

Figure 6:
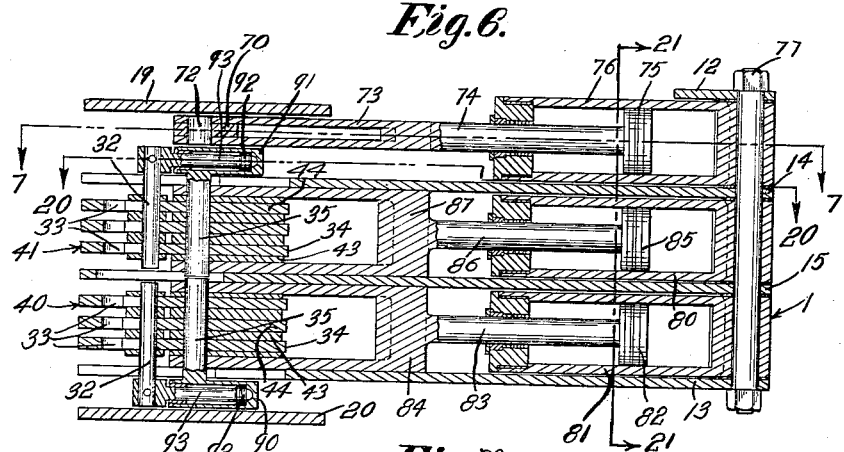
Fig. 6 is a longitudinal vertical section taken on line 6—6 of Fig. 3, showing elements of the operating cylinders and the gripping jaw means actuated thereby.

Fig. 20 is a horizontal section taken on line 20—20 of Fig. 6.

Fig. 21 is a cross section taken on line 21—21 of Figs. 6 and 20, showing the relation of the fluid cylinders.

Figure 8:
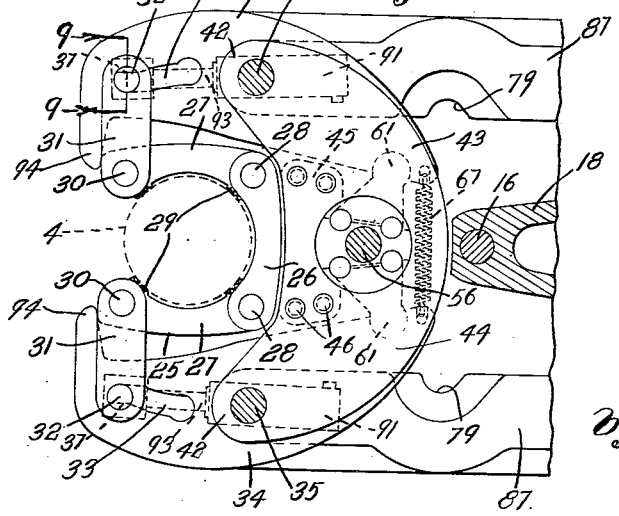
Fig. 8 is an enlarged fragmentary plan view of the gripping jaw means, with the jaws in closed position.

Fig. 22 is a fragmentary plan view similar to Fig. 8, showing the jaws in open position.

Fig. 23 is a diagrammatic view of the hydraulic fluid system.

In this illustrative embodiment of the invention the tonging mechanism, generally designated 1, is shown associated with a conventional oil well drilling apparatus comprising a rotary table 2, a derrick floor 3 and a drill pipe 4. The tonging mechanism, for illustrative purposes, is shown mounted on a horizontal slide 5 carried by a support 6 which is guided for vertical adjustment along a vertical guide 7 mounted on the derrick floor at one side of the rotary table. Fluid cylinders 8 and 9 respectively serve to move the slide 5 horizontally for laterally positioning the tonging mechanisms with respect to the drill pipe and to move the support 6 vertically along its guideway to vary the elevation of the tonging mechanisms, in a well-known manner. Evidently, the tonging mechanism may be adjustably supported in other known manners, as for example, by a hanger suspended from the hoisting cable or an adjustable support mounted on the derrick, and it is not desired to limit the invention to the particular adjustable support provided.

Figure 7:
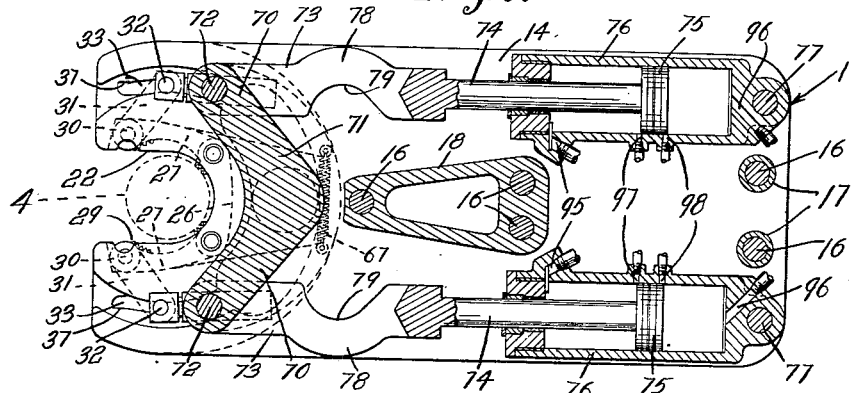
Fig. 7 is a horizontal section taken on line 7—7 of Fig. 6.

The tonging mechanism comprises, as shown in the drawings, a frame desirably of a fabricated plate-like construction having a generally triangular horizontal top plate 12, a generally rectangular horizontal bottom plate 13 and parallel intermediate plates 14 and 15 similar to the plate 13, with the several plates held in rigidly spaced parallel relation by bolts 16 passing through spacing elements 17 and 18 which, at their opposite surfaces, abut the surfaces of the plates (Figs. 3, 4 and 7). The spacing elements 17 are in the form of sleeves surrounding the bolts 16 and disposed between the plates, while the elements 18 consist of spacing blocks (Figs. 4 and 7). Arranged horizontally between the plates 12 and 14, beneath the top plate, and projecting outwardly from the frame-plates is a horizontal plate 19, likewise generally triangular in shape, and disposed beneath the bottom frame-plate 13 is a similar horizontal plate 20, and these plates are held in assembled relation on the frame by certain of the bolts 16 and by a lower bolt and pivot-providing element 21 secured to the bottom frame-plate (Fig. 4). The outer portions of the parallel plates are longitudinally recessed at 22 with the recesses extending longitudinally of the tonging mechanism and opening outwardly through the outer ends of the plates. Fitted within the recesses 22 of the pairs of plates 14, 19 and 13, 20 and secured to the plates are oppositely extending arcuate members 23 and 24 having flanges secured, as by bolts 24', to the plates 14, 19 and 13, 20. The arcuate portions of the members 23 and 24 are adapted to embrace the adjacent side of the drill pipe line, as shown in Fig. 4.

Figure 9:
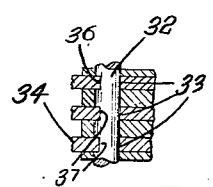
Fig. 9 is a detail vertical section taken on line 9—9 of Fig. 8, showing elements of the jaw structure.

Now referring to the pipe gripping means of the lower holding and upper operating tongs of the tonging mechanism, it will be noted that they are in the form of heads or jaw assemblies and are of identical structure, and each includes superimposed arcuate jaw elements 25, each of a laminated plate-like structure consisting of alternate elements 26 and 27 (Figs. 4 and 8). The intermediate jaw elements 26 have a floating motion and are loosely connected at their ends by vertical pins 28 to the side jaw elements 27 and these jaw elements have curved inner surfaces so that they may embrace the drill pipe. The curved inner surfaces of the side jaw elements 27 are serrated or toothed at 29 so that they may firmly grip the exterior periphery of the drill pipe. Pivotally connected, as by pins 30, to the remote ends of the side jaw elements 27 are superimposed horizontally swingable links 31, of laminated structure, and the outer ends of these links carry vertical pivot pins 32 which are guided in grooves 33 formed in oppositely disposed lever arms 34 composed of superimposed plates and pivoted on vertical pivot pins 35 to swing in horizontal planes toward and from one another. The pins 32 have flattened sides at 36 (Fig. 9) and flat surfaces 37 (Figs. 7 and 8) are formed on the outer walls of the grooves 33 so that when the pins are at the outer ends of the grooves the flat surfaces are in engagement in such manner as to provide wide bearing surfaces adequate to withstand the high pressures involved during the pipe gripping operation.

The gripping jaw means of the lower holding tong is generally designated 40 and the gripping jaw means of the upper operating tong is generally designated 41 and in each gripping means the pivot pins 35 for the lever arms 34 are respectively supported at the remote ends of oppositely extending arms 42 of a rocking member or yoke 43. The yoke 43 of each gripping means is desirably of a laminated structure and includes superimposed plates 44 separated by spacing plates 45, and these plates 44 and 45 are secured together as a unit, as by rivets 46 (Fig. 8).

The rocking member 43 of the lower gripping jar means 40 is pivotally mounted on an upright rotary cam shaft 47 which extends through an arcuate slot 48 in the bottom frame-plate 13 and at its lower end rests, at 49, against the top surface of the lower plate 20. This lower cam shaft has an integral lever 50 extending horizontally between the plates 13 and 20 and provided with a longitudinal slot 51 in its outer end portion. The bolt or pivot element 21 passes through this arm slot (Figs. 4 and 5). Thus the lever 50 may have bodily movement relative to the frame as the lever is swung horizontally. An upper upright cam shaft 53 extends vertically through an arcuate slot 54 (Fig. 14) in the frame-plate 14 and the adjacent ends of the cam shafts 47 and 53 are provided with reduced portions or pintles 55 and 56 respectively, which extend inwardly into substantial abutting relation within an arcuate slot 57 in the frame-plate 15 (Fig. 13). The cooperation of the pintles 55 and 56 with the arcuate slot 57 provides adequate guiding means for the gripping jaw assemblies during actuation of the jaws, thereby to provide for oscillatory movement of the jaw assemblies relative to the frame.

The lower cam shaft 47 is associated with the gripping jaws of the lower hold-back tong while the upper cam shaft 53 is associated with the gripping jaws of the upper make and break tong, and each of these cam shafts is horizontally slotted at its opposite sides at 60 to receive toggles 61, there being three superimposed toggles at each side of the shaft. These toggles have three lobes or pivot portions 62, 63 and 64 and the cam shaft at the bottoms of the slots are arcuately recessed at 65 to provide seats for receiving the lobes 62 and 63 (Fig. 12). The lobes 64 at the outer ends of the toggles are received in arcuate seats 66 in the superimposed plates of the lever arms 34 (Fig. 10). Coil springs 67 extending between the inner ends of the lever arms 34 yieldingly urge the inner ends of the arms toward one another to maintain the toggle-lobes 64 within their arcuate seats 66 on the lever arms.

Formed integral with the upper portion of the upper cam shaft 53 are oppositely extending arms 70 of a rocking member or yoke 71 and pivotally connected to the outer ends of these yoke arms by vertical pivot pins 72 (Figs. 6 and 7) are yokes 73 integral with piston rods 74 of reciprocable pistons 75 contained in horizontal fluid cylinders 76 (Figs. 6 and 7). The cylinders are pivotally mounted on vertical pivot bolts 77 arranged parallel with the bolts 16 and secured to the frame-plates thereby permitting limited horizontal swinging of the cylinders in the horizontal space between the top plate 12 and the intermediate plate 14. The yokes 73 are arcuately formed at 78 to provide recesses 79 at their inner sides so as to clear the upper cam shaft 53 in certain positions of the yokes. Also pivotally mounted on the pivot bolts 77 and arranged in the space between frame-plates 14, 15 and 13 are superimposed horizontal fluid cylinders 80 and 81 (see Fig. 21). Reciprocable in the pair of lower cylinders 81 are pistons 82 having piston rods 83 secured to yokes 84 which are respectively pivotally connected by the pivot pins 35 to the lever arms 34 (Fig. 6) of the gripping jaws of the lower gripping jaw means 40. Reciprocable in the cylinders 80 are pistons 85 having their piston rods 86 secured to yokes 87 which are connected to the pivot pins 35 for the lever arms 34 of the upper gripping jaw means 41, as is also shown in Fig. 6. The inner sides of the yokes 84 and 87 are recessed at their inner sides so as to clear the cam shafts 47 and 53 (Figs. 8, 16, 17 and 18), in the manner of the recesses 79 in the yokes 73.

Now referring to the means for closing the jaws, it will be noted that a pair of horizontal fluid cylinders 90 are secured to the lower ends of the vertical pivot pins 35 for the lever arms 34 of the lower gripping jaw means 40, while a similar pair of fluid cylinders 91 are secured to the upper ends of the vertical pivot pins 35 for the lever arms of the upper gripping jaw means 41 (see Figs. 6 and 20). Thus the pivot pins 35 provide trunnions for the fluid cylinders 90 and 91 to provide for horizontal swiveling thereof. These cylinders contain reciprocable pistons 92 having their piston rods 93 extending outwardly and connected to the vertical linkpins 32 which are guided in the grooves 33 (Figs. 6, 7 and 8). When fluid under pressure is properly supplied to the cylinders 90 and 91, the pistons 92 are actuated to move the pins 32 outwardly along the grooves 33 to the position shown in Fig. 8, thereby to cause the swingable links 31 to close the jaw members 27 to bring the latter nearly into contact with the drill pipe. When the pistons 92 are retracted in their cylinders, the pins 32 are moved inwardly along the grooves 33 to the position shown in Fig. 22, with the jaws in open position.

The superimposed plates of the lever arms 34 have inwardly directed lip-like projections or retaining portions 94 at their outer end portions and these projections 94 serve to restrain the jaw assemblies during gripping of the drill pipe (Figs. 8, 16, 17, 18, 19 and 22).

When fluid under pressure is properly supplied to the superimposed lower cylinders 80 and 81, the pistons 82 and 85 are actuated to cause rocking of the yoke members 43 of the lower and upper gripping jaw means 40 and 41, thereby to move the cam shafts 47 and 53 laterally in the arcuate slots 48 and 54 in the frame-plates 13 and 14. Such movement of the yoke members causes relative rotative movement between the yoke members and the cam shafts thereby to effect swinging of the lever arms 34 through the toggles 61 (Fig. 15) and the gripping jaws are, at that time, moved into pipe gripping position with the serrations of the side jaw elements "biting" into the pipe. At this time, the lower gripping jaw means 40 is in the position shown in Fig. 16 with the jaws of the lower hold-back tongs gripping the lower or box-half of the tool joint to hold the latter against rotation in the desired direction. The gripping jaw means 41 of the upper operating tong concurrently assumes the pipe gripping position shown in Fig. 17. Evidently, by rocking the yoke members in an opposite manner, the direction in which the upper and lower gripping jaw means grip the drill pipe will be reversed. The reverse gripping position of the upper operating tong is shown in Fig. 18.

When the upper gripping jaw means 41 of the upper operating tong has taken its "bite" on the upper or pin-half of the tool joint, fluid under pressure may be properly supplied to the top cylinders 76 to actuate the pistons 75, thereby to rock the yoke member 71 from the broken line position shown in Fig. 19 to the full line position in that figure to turn the upper cam shaft 53 in the proper direction. Turning of this cam shaft effects, through the toggles 61, swinging of the lever arms 34, thereby to turn the gripping jaws in a direction to rotate the upper pipe section to break or loosen the tool joint. As shown in Fig. 18, the direction of rotation of the upper pipe section may be reversed to make or tighten the joint simply by reversing the gripping jaw means, as shown in Fig. 18.

The flow passage arrangements for supplying fluid to and for venting fluid from the several operating cylinders may assume various known forms, and, as for example, the pairs of fluid cylinders 76, 80 and 81 each may have end ports 95 and 96 communicating with opposite ends of the cylinders and intermediate ports 97 and 98 communicating with the cylinders near the central portions thereof, as shown in Fig. 7, and fluid under pressure may enter the cylinders at opposite sides of the pistons for positioning the latter to effect centering of the tong jaws during initial engagement thereof with, or disengagement thereof from, the tool joint; there being a flow of fluid in at ports 96, out at ports 98, in at ports 95 and out at ports 97; this being a one-series flow. Also to effect centering of the tong jaws, fluid under pressure may flow concurrently through ports 95 and 96 to the opposite ends of the cylinders at opposite sides of the pistons while the ports 97 and 98 are concurrently connected to exhaust, to effect flow in parallel thereby to maintain the pistons centered, as shown in Fig. 7. This latter arrangement is shown more specifically herein, although fluid flow in accordance with the series flow arrangement or other arrangements may be employed if desired.

As shown diagrammatically for illustrative purposes in Fig. 23, a conventional motor driven pump 100 has its suction side connected by a conduit 101 to a fluid storage tank 102 and the discharge side of the pump is connected by a conduit 103 to the pressure passage of a valve box 104 of a conventional control valve mechanism. The pump, storage tank and control valve mechanism may be mounted in any suitable manner on the frame of the tonging mechanism, as will be evident to those skilled in the art. The discharge passage of the valve box is connected by a return conduit 105 back to the tank. The valve box has usual parallel bores for receiving conventional slide valves of the balanced spool type, respectively designated 106, 107, 108, 109, 110, 111 and 112, each having a suitable operating handle. The bores containing the slide valves 106 and 112 respectively, are connected by branched conduits 113 and 114 to the pairs of fluid cylinders 90 and 91 for initially closing the gripping jaws. The bore containing the slide valve 107 is connected by a conduit 115 having branches respectively leading to the front end of one of the cylinders 76 and to the rear end of the other of the cylinders and by a conduit 116 having branches respectively leading to the opposite ends of these cylinders. A return conduit 117 has branches communicating with the ports 97 and 98 (Fig. 7) of the cylinders 76 and connected to the return conduit 105, and flow through the conduit 117 is controlled by a conventional hand valve 118. The bore containing the slide valve 108 is connected by a conduit 119 having branches respectively leading to the front end of one of the cylinders 80 and to the rear end of the other cylinder and by a conduit 120 having branches respectively leading to the opposite ends of these cylinders. A return conduit 121 has branches communicating with the ports 97 and 98 of the cylinders 80 and is connected to the return conduit 105, and flow through the conduit 121 is controlled by a conventional hand valve 122. The bore containing the slide valve 109 is connected by a conduit 123 having branches respectively communicating with the front end of one of the cylinders 81 and with the rear end of the opposite cylinder and by a conduit 124 having branches respectively communicating with the opposite ends of these cylinders. A conduit 125 has branches communicating with the ports 97 and 98 of the cylinders 81 and is connected to the return conduit 105, and flow through the conduit 125 is controlled by a conventional hand valve 126. The bore containing the slide valve 110 is connected by a conduit 127 to the elevating cylinder 9 for the tong mechanism, while the bore containing the slide valve 111 is connected by conduits 128 and 129 to the opposite ends of the horizontal cylinder 8 for laterally shifting the tong mechanism with respect to the drill pipe.

Figure 1:
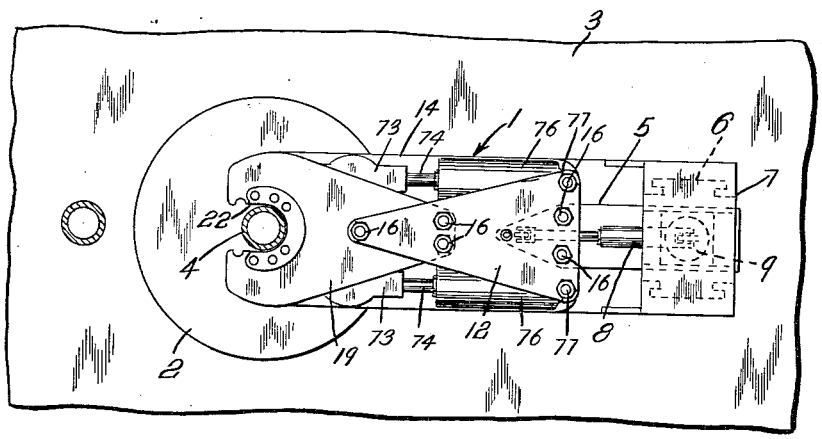
Fig. 1 is a plan view of the improved tonging mechanism shown in association with an oil well drilling apparatus.
Figure 2:
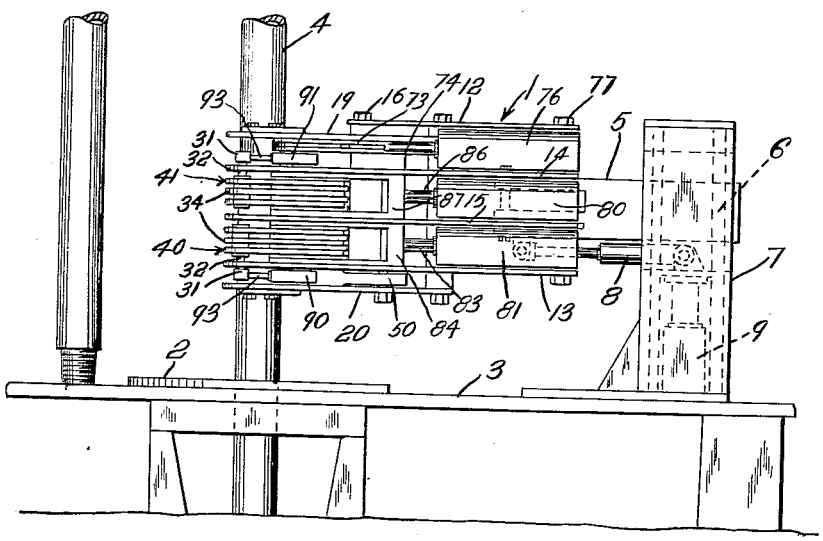
Fig. 2 is a side elevational view of the drilling apparatus and tonging mechanism shown in Fig. 1.

The general mode of operation of the improved tonging mechanism will be clearly apparent from the description given but will now be summarized. The tonging mechanism may be positioned, as shown in Figs. 1 and 2, by moving the same laterally with respect to the drill pipe line 4 by the slide operating cylinder 8 and by elevating the same by the elevating cylinder 9, properly to locate the lower gripping jaw means 40 just below the tool joint and the upper gripping jaw means 41 just above the tool joint. The slide valves 106 and 112 may then be manipulated to effect fluid supply to the cylinders 90, 91 initially to position the gripping jaws with respect to the drill pipe. The slide valves 107, 108 and 109 may then be properly positioned to effect fluid supply to one end of one cylinder and concurrently to the opposite end of the other cylinder of the pairs of cylinders 76, 80 and 81, thereby to effect centering of the jaws with respect to the drill pipe; it being understood that at that time the hand valves 118, 122 and 126 are open so that the fluid may exhaust from the cylinders through the ports 97 and 98. The hand valves 118, 122 and 126 may then be closed, and the slide valves 108 and 109 may be positioned to effect fluid supply to the cylinders 80 and 81 to cause the latter to rock the gripping jaw means 40 and 41 firmly to grip the drill pipe sections below and above the tool joint. The slide valve 107 may then be positioned to effect fluid supply to the upper cylinders 76 to rock or slue the upper gripping means 41 to turn the upper pipe section relative to the lower section to break or loosen the joint. As the upper pipe section is turned by the upper tongs the lower pipe section is held against rotation by the lower tong. By properly positioning the slide valves 106, 107, 108, 109 and 112 fluid may be vented from the several fluid cylinders to effect release of the tongs. During making or tightening of a tool joint the slide valves 107, 108 and 109 may be positioned to cause actuation of the cylinders 76, 80 and 81 to effect rocking or sluing of the gripping jaw means 40 and 41 in an opposite direction.

As a result of this invention, an improved tonging mechanism is provided for making and breaking the joints of the drill pipe of an oil well drilling apparatus. By the provision of the improved arrangement of the pipe gripping means on a single frame an improved tonging mechanism is provided, embodying a hold-back tong and an operating tong, in a single, unitary structure. The improved operating cylinder arrangement and the control means therefor enables improved control of the gripping jaw means of the tongs. The structure is not only relatively compact and embodied in a self-contained unit but is also relatively simple and rugged in design, well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a tonging mechanism for making and breaking joints of a drill pipe, a frame, a lower hold-back tong having gripping means for gripping a lower pipe section, an upper operating tong having gripping means for gripping an upper pipe section, means for mounting said tongs within said frame, each of said tongs having a rocking gripping head by which the gripping means is carried guided for oscillatory movement on said frame, and power operated means on said frame for rocking said gripping heads relative to said frame to effect gripping of the drill pipe.

2. A tonging mechanism as set forth in claim 1 wherein said power operated means for said gripping head of said upper operating tong includes means for first rocking said head to cause the gripping means firmly to grip the drill pipe section and for thereafter, when the pipe section is tightly gripped, effecting continued rocking of said head to turn the pipe section gripped thereby to break the joint.

3. In a tonging mechanism for making and breaking joints of a drill pipe, comprising a frame, a pipe gripping head mounted on said frame for guided oscillatory movement relative thereto and including movable jaw means, power operated means on said frame for opening and closing said jaw means, said jaw means when closed adapted to embrace a drill pipe section, power operated means for actuating said jaw means when closed initially tightly to grip the drill pipe and power operated means for thereafter sluing said oscillatory head to turn the pipe section tightly gripped by said jaw means.

4. A tonging mechanism as set forth in claim 3 wherein each of said power operated means includes a pair of cooperating extensible power devices, said power devices for oscillating said head being oppositely acting and operatively connected to the opposite sides of said head.

5. A tonging mechanism as set forth in claim 4 wherein said extensible power devices each comprises cooperating fluid cylinder and piston elements having relative reciprocatory movement.

6. In a tonging mechanism for making and breaking the joints of a drill pipe comprising a frame having means providing an arcuate guideway, a gripping jaw assembly adapted to engage a drill pipe section and mounted on said frame for rocking movement along said guideway, and extensible power devices arranged on said frame and operatively connected to the opposite sides of said jaw assembly for effecting rocking movement of the latter to cause said jaw assembly tightly to grip the drill pipe.

7. A tonging mechanism as set forth in claim 6 wherein said gripping jaw assembly includes movable gripping jaws disposable in open and closed positions and power operated means is embodied in the jaw assembly for moving said jaws between said positions.

8. A tonging mechanism as set forth in claim 6 wherein additional power devices are mounted on said frame and are operatively connected to said jaw assembly at the opposite sides thereof for further rocking said jaw assembly relative to said frame to turn the pipe section tightly gripped by said jaw assembly.

9. In a tonging mechanism for making and breaking the joints of a drill pipe comprising a frame, a gripping jaw assembly, means for mounting said jaw assembly on said frame for guided oscillatory rocking movement relative thereto into and out of pipe gripping position, said jaw assembly comprising a pair of oppositely disposed lever arms connected to relatively movable gripping jaw means, means embodied in said jaw assembly for opening and closing said jaw means, and means carried by said frame and operatively connected to said jaw assembly for moving the closed jaw means firmly into gripping relation with the drill pipe.

10. A tonging mechanism as set forth in claim 9 wherein said means for opening and closing said jaw means includes a pair of extensible power devices and means for respectively connecting said power devices to the opposite sides of said gripping jaw means.

11. In a tonging mechanism for making and breaking the joints of a drill pipe comprising a frame, a rocking gripping jaw assembly, means for mounting said jaw assembly on said frame for guided oscillatory movement relative to said frame into and out of pipe gripping position, said jaw assembly including movable gripping jaws, means embodied in said jaw assembly for moving said jaws into pipe gripping position including a pair of oppositely movable lever arms operatively connected to said jaws, power operated means for swinging said lever arms to move said jaws into tight pipe gripping position, and power operated means for rocking said jaw assembly relative to said frame when said jaws are in gripping position to turn the pipe section gripped by said jaws.

12. A tonging mechanism as set forth in claim 11 wherein said means for swinging said lever arms includes a rotary cam member arranged between and associated with both lever arms.

13. A tonging mechanism as set forth in claim 12 wherein toggles are arranged between said cam member and said lever arms respectively.

14. A tonging mechanism as set forth in claim 11 wherein additional power operated means is provided for opening and closing said jaws.

15. A tonging mechanism for making and breaking the joints of a drill pipe comprising a frame, a gripping jaw assembly, means for mounting said jaw assembly on said frame for guided oscillatory movement relative to said frame, said jaw assembly embodying movable gripping jaws, power operated means on said frame for oscillating said jaw assembly relative to said frame to effect tight gripping of a pipe section, and additional power operated means on said frame for further sluing said jaw assembly after the pipe section is tightly gripped by said jaws to effect turning of the pipe section gripped thereby.

16. A tonging mechanism as set forth in claim 15 wherein both of said power operated means comprise oppositely acting extensible power devices arranged at the opposite sides of said frame and operatively connected to said jaw assembly at the opposite sides of the latter.

17. A tonging mechanism for making and breaking the joints of a drill pipe comprising a frame, a gripping head, means for mounting said gripping head on said frame for guided oscillatory movement relative thereto, said head including movable gripping jaws disposable in open and closed positions, means on said frame and operatively connected to said oscillatory head for oscillating the latter to cause said jaws to grip a drill pipe section comprising a pair of oppositely swingable lever arms, pivotal mountings for said lever arms, means operatively associated with said pivotal mountings respectively for closing said jaws, and means for swinging said lever arms about their pivotal mountings to cause said jaws when in closed position to grip the drill pipe section.

18. A tonging mechanism as set forth in claim 17 wherein said lever arms are horizontally swingable and said pivotal mountings include vertical pivot pins and said opening and closing means for said jaws includes elements mounted on said pivot pins respectively.

19. A tonging mechanism as set forth in claim 17 wherein said means for swinging said lever arms comprises a rotary member, a yoke connected to said member and having oppositely extending yoke arms and oppositely acting extensible power devices are mounted on said frame and are connected to said yoke arms respectively.

20. A tonging mechanism for making and breaking the joints of a drill pipe comprising a frame, a gripping head, means for mounting said gripping head on said frame for guided oscillatory movement relative thereto, said head including gripping jaws movable into and out of closed position with respect to a drill pipe section, power operated means mounted on said gripping head for moving said jaws into closed position, and means mounted on said frame and operatively connected to the opposite sides of said head for oscillating the latter to cause said jaws tightly to grip the drill pipe section.

21. A tonging mechanism as set forth in claim 20 wherein additional power operated means is operatively associated with said oscillatory head for further turning said head relative to said frame after the pipe section is gripped by said jaws to effect turning of the pipe section thereby to break the joint.

22. A tonging mechanism for making and breaking the joints of a drill pipe comprising a frame, a gripping head, means for mounting said gripping head on said frame for guided oscillatory movement relative thereto, said head including gripping jaws movable into and out of gripping position with respect to the drill pipe section, and means on said frame and operatively connected to said head for oscillating the latter to cause said jaws to grip a drill pipe section, said gripping head having oppositely swingable lever arms operatively connected to said jaws, a cam member arranged between and operatively associated with said lever arms, a lever connected to said cam member, and a lost-motion connection between said lever and said frame.

23. A tonging mechanism as set forth in claim 22 wherein said lost-motion connection between said lever and said frame includes a longitudinal slot in said lever of said cam member and a pin secured to said frame and passing through said slot.

24. A tonging mechanism for making and breaking the joints of a drill pipe comprising a frame, a gripping head, means for mounting said head for guided oscillatory movement relative to said frame into and out of gripping position, said head including movable gripping jaws, and means for actuating said jaws including a pair of oppositely disposed pivoted lever arms, means operatively connected to the inner ends of said lever arms for swinging said arms toward and from one another, and flexible connections between the outer ends of said lever arms and the opposite sides of said jaws whereby said jaws have a floating mounting on said lever arms.

25. A tonging mechanism as set forth in claim 24 wherein said flexible connections between said lever arms and said jaws include pivoted links.

26. A tonging mechanism as set forth in claim 25 wherein means is operatively connected to said links for swinging the latter relative to said lever arms to effect actuation of said jaws.

27. A tonging mechanism as set forth in claim 26 wherein said means for swinging said links includes upright pivot pins and grooves on said lever arms for guiding said pins.

28. A tonging mechanism as set forth in claim 27 wherein the walls of said grooves are provided with flat surfaces and said pins have flattened surfaces contacting said flat groove surfaces when said jaws are in pipe gripping position.

29. A tonging mechanism comprising a gripping jaw assembly including cooperating arcuate jaw elements adapted to embrace a drill pipe, said jaw elements including an intermediate floating jaw element and side jaw elements pivotally connected to the ends of said intermediate element, and means operatively connected to the remote ends of said side jaw elements for actuating said jaw elements.

30. A tonging mechanism as set forth in claim 29 wherein each of said three jaw elements is of a laminated platelike construction with the plates of each jaw element interleaved with the plates of another.

31. A tonging mechanism as set forth in claim 29 wherein said side jaw elements support said intermediate floating jaw element and have serrations at their curved inner sides for firmly gripping a drill pipe.

32. A tonging mechanism for a drill pipe comprising a frame, an oscillatory gripping head guided in said frame and including gripping jaw means movable into and out of pipe gripping position, means for oscillating said head relative to said frame including oppositely swingable lever arms pivotally mounted on said head and having upright pivot elements at the opposite sides of said head, and additional means on said frame for oscillating said head including oppositely acting power devices engaging said pivot elements respectively.

33. A tonging mechanism as set forth in claim 32 wherein means is provided on said head for actuating said gripping jaw means relative to said head and including additional oppositely acting power devices also operatively associated with said pivot elements respectively.

34. A tonging mechanism as set forth in claim 33 wherein said last-mentioned power devices include fluid cylinders secured to said pivot elements respectively whereby said pivot elements provide trunnions for said cylinders.

35. A tonging mechanism comprising a frame, gripping jaws carried by said frame and movable into and out of pipe gripping position, means on said frame for moving said jaws into gripping position including oppositely swingable lever arms, means for pivotally mounting said lever arms for horizontal swinging movement including vertical pivot pins, operative connections between said lever arms and said jaws including horizontally swingable links having vertical pivot pins, and means for closing said jaws including fluid cylinders mounted on said first-mentioned pivot pins respectively, and pistons reciprocable in said cylinders and engaging said second-mentioned pivot pins respectively.

References Cited in the file of this patent
UNITED STATES PATENTS

| | | |
|---|---|---|
| 1,259,670 | Richard | Mar. 19, 1918 |
| 2,450,934 | Calhoun | Oct. 12, 1948 |
| 2,544,639 | Calhoun | Mar. 13, 1951 |
| 2,627,195 | Sporket | Feb. 3, 1953 |
| 2,639,894 | Smith | May 26, 1953 |